United States Patent Office 3,227,562
Patented Jan. 4, 1966

3,227,562
CITRUS FRUIT JUICE CONCENTRATES
Cora I. Houghtaling, 1330 NW. 96 St., Miami, Fla.;
Francis Spencer Houghtaling, 488 NE. 101 St., Miami,
Fla.; Nestor E. Houghtaling, 1300 NW. 96 St., Miami,
Fla.; and Robert W. Kilburn, 920 Carlton Ave., Lake
Wales, Fla.
No Drawing. Filed Mar. 29, 1962, Ser. No. 183,409
6 Claims. (Cl. 99—205)

This invention relates to fruit juice concentrates and to additives therefor. More particularly, it relates to the preparation of an improved fresh citrus fruit juice concentrate of novel characteristics.

In the past decade, the expansion of the juice concentrate industry has been extreme and the consumption of juices, particularly of citrus origin, has risen spectacularly.

Citrus fruits especially have been concentrated for use for reconstituting as a drink containing pleasant taste, high vitamin C content and appetizing appeal. Thus far, the concentrates have been limited to bases of orange, grapefruit and, to a lesser extent, lemon, separately or in admixture and these are usually fresh-frozen juices of the fruit.

Such concentrates are usually processed in the same way. After the fruit is washed, sterilized and sorted for size and uniformity, the juice is extracted and the major portion evaporated under vacuum to about 55% solids. This is then mixed with enough original juice to lower the solids content to 42%. Sugar is added to the desired taste and the mixture refrigerated to a slush-frozen condition, when it is placed in the cans and sharp-frozen. The canned frozen juice is stored at —10° F. in warehouses and ultimately reaches the home refrigerator. When opened, the 42% solids content allows addition of three parts of water to give four parts of the final juice.

The addition of fresh juice to the 55% solids concentration is an important step in the manufacture, since this "cutback" principle restores volatile flavoring materials partially lost during evaporation and allows reintroduction of pulpy juice cells, as well as assisting the control of concentration of the finished product.

This finished product falls within a range of sweetness within very narrow limits. Beyond strict statutory requirements of quality, flavor and solids concentration, there is also the important factor, a public acceptance.

It is imperative in such a juice for acceptability to reconstitute the canned frozen concentrate into a tart, pleasant non-watery drink which has human palate appeal equivalent to natural juices squeezed fresh from the fruit by the consumer.

In the fruit juice concentrate industry, the relative sweetness-to-tartness relationship is known as the Brix-acid ratio. The Brix unit is a commonly used unit of measurement to express the concentration of dissolved solids in an aqueous solution and has been specified as the unit to be used in all Food and Drug Administration, U.S. Department of Agriculture and the Florida Citrus Code for fruit products and particularly for concentrated fruit juices. The acid unit is the citric acid concentration in the citrus juice. A Brix-acid ratio is obtained by dividing the Brix value by the acid value of a given product, and this gives a ratio compared with unity which forms a comparative scale for acceptability of such juice concentrates.

The methods of obtaining the Brix value and the acidic value of a juice concentrate are conventional and well known laboratory procedures, and can be readily obtained from the government agencies above identified, who use the Brix-acid ratio as a standard for a citrus juice concentrate.

As examples of Brix-acid ratios of concentrated citrus fruit juices, high-grade fresh-frozen orange juice or grapefruit juice concentrate will usually have a Brix-acid ratio of 14:1. A range of Brix-acid ratios for many well known commercial fruit juice drinks of citrus base ranges from 17:1 all the way to 54:1. In all such drinks, sugar is added to offset the sourness of the citrus juice and this may result in a syrupy final product. Also, if the solids content is too low, the final drink may be watery and insipid. Accordingly, careful formulation is needed in all such products in order to ensure acceptability of the final drink at consumer level as well as approval of the concentrated product at Government control level. It is reiterated that the better quality products on the fruit juice market have at the lowest Brix-acid ratio of 14:1 and are more usually at 17:1 upwardly. Normally, Brix-acid ratios below 14:1 yield a drink which is excessively tart and are commercially unacceptable to the consumer. Even the addition of large quantities of sugar to offset the sour taste fail to make these low ratio drinks palatable since the result is a syrupy or cloying taste which is objectionable to the average consumer.

It is the main object of the present invention to provide a new and improved citrus fruit concentrate which will provide a drink with a low Brix-acid ratio with an unusually tart taste and pleasant flavor.

It is a further object of the present invention to provide a citrus fruit concentrate of unusual palatability with less sugar addition and more natural fruit flavor than heretofore believed possible, the Brix-acid ratio being extremely low and below 14:1.

It is another object of the present invention to provide an additive of synergistic compounds which can be used with a citrus fruit concentrate to enhance flavor and keep the Brix-acid ratio low, without unnecessary tartness, harshness of flavor or use of large quantities of sugar.

It is an important object of the present invention to provide the formulation and composition of a fresh citrus fruit juice concentrate with a refreshing and pleasingly tart taste and possessing a dilution potential and normal temperature storage requirements widely and uniquely differing from other known fresh citrus fruit juice concentrates on the market today.

In practicing the invention, a citrus fruit concentrate, preferably made up of several species of citrus fruit with or without the juices of other fruit, is formed in combination with an additive or additives which allow a low Brix-acid ratio to be attained, such as 11:1, and prevent the need of refrigeration of the finished concentrate or its original freezing, the juice or drink formed from the concentrate of the present invention being of a natural, tart, pleasing taste, flavor and appearance and, moreover, being capable of a variation of dilution, even dilutions of as much as 15:1, and more, without becoming thin, watery or otherwise unacceptable.

The fruit juice concentrate of the present invention can be stored on open shelves, i.e., without refrigeration, is not a frozen product and therefore does not have to be defrosted but is available for instant use, yet takes up little shelf room in store or home due to its concentrated condition.

The concentrate of the present invention is novel in that it possesses an unusually tart taste with a Brix-acid ratio, for example, of 11:1. Having such a low ratio, its pleasant flavor is a distinct surprise to workers of long experience in the fields of blending and concentrating fresh citrus juices and to other technicians in the industry who are familiar with the standard and conventional formulation described above and with the prescribed official methods of chemical calculation applied thereto.

For example, straight orange juice with a Brix-acid ratio of 11:1 possesses a tartness which is definitely unsatisfactory because of the flavor and must be graded "substandard" under the provisions of the State of Florida Citrus Code of 1949. However, at a Brix-ratio of as low as 11:1, the concentrate of the novel composition herein disclosed has a most pleasant flavor and a refreshing taste considered by many to be more appealing than any known sweetened product in this field. In comparison, it is to be observed that the very highest grade, fresh-frozen orange or grapefruit juice concentrate has a Brix-acid ratio of about 14:1 and, at best, 13:1.

According to the invention, the invention generally comprises a mixture of sugar and concentrated fruit juices, some of which are from citrus fruits blended together in proportion to yield a concentration of soluble solids between 68° and 75° Brix and with a citric acid concentration between 6.2 and 6.8% by weight to which may be added essential oils from natural citrus fruits, together with an additive comprising an intimate mixture of the salts containing the cations sodium, magnesium, calcium, iron, potassium, manganese and aluminum and the anions chloride, oxide, silicate, iodide, bromide and sulfate.

The concentration thus obtained will have a Brix-acid ratio which is very low and which will be below 14:1 and which will normally be nearer a value of 10:1 or 11:1. Despite this unusually lower Brix-acid ratio, the juice drink, when formed from the concentrate, is a most pleasant, palatable and acceptable drink having high vitamin C content, smooth consistency and a tart, tangy, natural fruit-like taste. The degree of dilution of the concentrate can be made to the usual three-to-one degree of similar concentrate juices, if desired, but it has been found that a dilution factor of 6:1 up to 8:1 can be used with the concentrate according to the present invention, without any loss of flavor or palatability and without becoming insipid or watery. If a mild drink of less flavor value is desired, the concentrate according to the invention can be diluted even more, up to about 15:1 or more, without unacceptable lack of flavor, watery, insipid taste or like objections usual with over-diluted juice concentrates.

The concentrate of the present invention is not frozen at any time and does not require any refrigeration when being transported or when stored. When the concentrate is exposed to air upon opening the container therefor, there will be no fermentation or spoilage for a considerable time. In like manner, a drink made from the concentrate, at any strength, does not require refrigeration of any kind.

When made into a mild drink on the order of lemonade, the juice drink of the present invention will have appeal to the taste of all age groups, including children, when the Brix-acid ratio is reduced by dilution with water or the like to the usual value of such mild drinks which have a Brix-acid ratio of about from 15:1 up to about 20:1.

The degree of dilution of the concentrate of the present invention can vary within a wide range, to suit the user's taste.

Generally, in practicing the present invention, the juices of several fresh citrus fruits are blended together, with or without additional fruit juices. For example, fresh orange, lemon, lime, grapefruit may be used together with pineapple juice to form a five-component fruit juice drink.

Alternatively, lemon or lime may be omitted from the mixture since the main source of the citric acid content of the mixture may be derived from the lemon or lime juice.

As a general procedure for carrying out the invention, the following is given:

A blend is formulated from the concentrated juices of fresh lemon, lime, orange, grapefruit and pineapple. Sugar is added in the proper amount to raise the Brix-acid ratio which balances the tartness of the mixture and imparts consistency to the product. An additive containing minerals, added according to the prescribed formula hereinafter given, not merely to enhance the flavor, but because the components in the additive materially affects the blend in taste and in action so that the addition is necessary. It is believed that the presence of these additive compounds in the blend are extremely efficient from a bactericidal standpoint as well as contributing to its appealing taste.

The total amount of fruit ingredients is maintained uniform and the relative amounts of the various fruits are adjusted, as disclosed in the formula hereinafter, to impart finally the desirable and distinctive flavor of the blend.

It is to be noted that the blend contains only fresh fruit; that no preservatives are added; that it is not pasteurized. This concentrate dilutes immediately to such drinking strength as may be desired individually. Although fortified with a formulation of additives, no flavors predominate, the proper formulation of ingredients yielding an end-product with high commercial appeal without the addition of flavor synthetics. The mixture was tested at 70° Brix or more.

If, for example, only lime and lemon juices are used in amount sufficient to obtain a similar 20.62% fruit solids in the final product, (sugar being added to bring the concentrate to 71.03 Brix), a totally unusable product results because of imbalance of sweetness to tartness. Similarly, if this is repeated with only grapefruit, or orange, or pineapple, the final product is insipid. Any other combination which will produce the Brix-acid ratio herein referred to can be utilized but it is especially emphasized that the necessity of preserving the relative proportions of the ingredients in combination must be observed so as to achieve the characteristics of the finished blend in order that the unexpected flavor result be obtained.

While some variation in the fruit juice components of the mixture can therefore be considered, these must be carefully selected.

It is preferred that the fruit juice mixture contain orange, grapefruit, pineapple together with either lemon or lime, or together with both lemon and lime.

The juice drink when compounded as outlined, yields a harmonious blend of flavors stimulating all sense areas. The orange and pineapple juices contribute aromatic flavor; grapefruit juice contributes a trace of bitterness, lemon or lime juice add pleasing tartness to the mixture. The mineral salt mixture additive enhances and blends the individual flavors and sugar is added to give the proper degree of sweetness.

Generally, fruit juice drinks are made by diluting fruit juice or mixtures of fruit juices with water, adding sugar, critic acid and other flavor ingredients. Large amounts of sugar are added to balance the acidity and give a pleasing drink. While developing the specific juice drink of the present invention, experiments were made to find a substitute for the large amount of sugar commonly used in products currently on the market. The addition of salt to the juice drink was tried because consumers frequently sprinkle salt on fresh fruit to improve the flavor. It was found that juice drinks do not lend themselves to the use of *common household salt*, i.e. sodium chloride, and the resulting product was frequently harsh and bitter. Other salts were mixed with common household salt to see if this effect could be eliminated and a zestful refreshing drink produced without the cloying effect of large amounts of sugar. A large number of inorganic salts are available, each with taste which differs from common table salts. A balance blend of these salts was found to be unusually effective in enhancing the flavor of fruit juice to yield a plesant zestful drink. This mixture of minerals as an additive was found to enhance the flavor of fruit juices to a degree which was completely unexpected.

In particular, it was found that sodium chloride plus magnesium chloride, calcium chloride and sodium silicate formed an excellent base for an additive for the desired purpose. If trace elements were added including materials selected from the list of ferric oxide, ferrous iodide, amorphous sulfur, sodium bromide, manganese oxide (black), these tend to improve the additive and render the results of addition to the concentrate as better. Also, gold compound, silver compound, potassium bichromate, and organic carbon may be used in small quantities in the additive if desired.

A quantity of calcium sulfate and aluminum oxide is also used in the mixture of concentrated fruit juices.

As specific examples of methods of making the new and improved citrus fruit concentrate according to the present invention, the following formulae are given with instructions of the manner of proceeding, it begin understood that these are exemplary of procedures which may be adopted to obtain the desired results.

The composition in each of the tables hereinafter given may be generalized as follows:

Sugar: fruit solids—2⅓ parts to 1 part (on a dry weight basis)

Citric acid to total solids (on a dry weight basis)—1 part to 11 parts

The concentrate used in all examples is as follows, broken down into weights of each concentrated juice, with the Brix of each juice noted and the weight being given in pounds and grams.

Table 1
Mix the following, cold pack:

| Concentrate of— | Degrees Brix | For one gallon concentrate | |
|---|---|---|---|
| Lime or lemon | 50 | 1.838 lb | 834.6 g. |
| Orange | 58 | 1.456 lb | 660.9 g. |
| Grapefruit | 58 | 0.655 lb | 297.2 g. |
| Pineapple | 60 | 0.283 lb | 128.5 g. |
| Total solids from fruit | | 4.232 lb | 1,921.2 g. |
| Add: Sugar (20 pounds) | | 5.540 lb | 2,515.2 g. |
| Total solids from fruit and sugar | | 9.972 lb | 4,436.4 g. |

To the mixture of fruit concentrates above set forth in Table I, the following ingredients should next be added from Table 2.

Table 2

Add:

Water (to give 70° Brix) _____ml__ 656.9
Orange oil _____ml__ 0.30
Lime or lemon oil _____ml__ 0.30
Mineral mixture additive _____g__ 14

The above additions of Tables 1 and 2 will provide one gallon proportions. The mineral mixture additive is hereinafter given in Table 3.

The lemon or lime oil and orange oil are conventional natural oil extracts from the fruit skins, available commercially as flavoring.

For each gallon of concentrate made by using Table 1 and Table 2, the following analysis applies:

(A)

Soluble solids in one (1) gallon concentrate (by weight):

g.
Lime or lemon _____ 417.3
Orange _____ 383.3
Grapefruit _____ 173.4
Pineapple _____ 77.1

Total _____ 1,050.1
Sugar _____ 2,515.2

Total _____ 3,565.3

(B)

Percentage of fruit solids derived from each type of fruit:

Lime or lemon _____ 39.74
Orange _____ 36.50
Grapefruit _____ 16.42
Pineapple _____ 7.34

Total _____ 100.00

(C)

Percentage of total soluble solids derived from each ingredient:

Lime and/or lemon _____ 11.71
Orange _____ 10.75
Grapefruit _____ 4.83
Pineapple _____ 2.16

Total _____ 29.45
Sugar _____ 70.55

Total for product _____ 100.00

(D)

Total percentage of fruit solids in final product—20.63%
Analysis of product for Brix index for concentration of dissolved solids in aqueous solution=71.03° Brix
Analysis for citric acid concentration by titration of product=6.39%, i.e. 100 grams of concentrated juice contains 6.39 grams of citric acid
Brix-acid ratio of final product $$\frac{71.03}{6.39} = 11.1:1$$

As above identified, according to the invention, an additive or additives must be utilized with the juice concentrate in order to obtain the desired results of acceptable palatability with low Brix-acid ratio. The additive mixture of minerals to be used can be formulated in the following manner:

Table 3

Sodium chloride _____lbs__ 10
Magnesium chloride ($MgCl_2 \cdot 6H_2O$) _____oz__ 4
Calcium chloride _____oz__ 2
Sodium silicate (water glass, 3½ oz.) ____ gm. av__ 100

The above chemicals are all ground together and then added to the following:

Table 4

Gms. av.
Ferric oxide (hematite) (1½ oz.) _____ 14
Amorphous sulfur (.175 oz.) _____ 5
Ferrous iodide (.07 oz.) _____ 2
Sodium bromide (.105 oz.) _____ 3
Manganese oxide (black) (.175 oz.) _____ 5

Thereafter, the following is added:

Table 5

Oz.
Calcium sulfate ($CaSO_4 2H_2O$) _____ 8
Aluminum oxide (anhydrous powder) _____ 2

Finally, the mixture of Tables 3, 4 and 5 is added to the following:

Table 6

Sodium chloride—55 lbs.

This final mixture is intimately blended and forms the final additive to be used as in Table 2. As there disclosed, 14 grams of this mixture should be added to each gallon of concentrate (by weight). The amount utilized can, however, be varied between limits and from 10 grams to 20 grams of the additive of Table 6 can be used for each gallon of concentrated fruit juices utilized depending upon the selection of the fruit juice and the blending proportions thereof.

As an alternate way of making the additive, the ingredients of Tables 3, 4 and 5 may be ground together, omitting the sodium chloride of Table 3 and then these may be thoroughly admixed with the sodium chloride of Tables 3 and 6, namely, 65 lbs. of sodium chloride which is the base of the additive, according to the invention.

Since the ingredients of Tables 3, 4, 5 and 6 are all dry, proper grinding and blending techniques conventional to mixing powdered or granular materials should be utilized to obtain a smooth dispersed blend of the ingredients through the sodium chloride.

Furthermore, while it has been recommended that the ingredients of the additive be formulated together in a specific sequence, obviously this could be dispensed with and the ingredients from Tables 3, 4, 5 and 6 all could be placed in a suitable ball or grinding mill at the same time and intimately mixed thereby. It is obvious that the object of proceeding through the stages of Tables 3, 4, 5 and 6 is to achieve an intimate mixture of dry ingredients as the additive.

If desired, traces of other materials may be used in the additive and these may be added at any stage in preparation. The following useful compounds may also be added in the amounts specified, to the mixture of Tables 3, 4, 5 and 6.

*Table 7*

| | Gr. av. |
|---|---|
| Gold compound | 125 |
| Silver compound | 125 |
| Potassium bichromate | 125 |
| Carbon (organic) | 233 |

The additive hereinbefore defined is an admixture of the ingredients outlined with sodium chloride as a base. By using same in the general proportions given hereinbefore, less sugar can be used and a palatable, acceptable and novel drink obtained with a Brix-acid ratio of a low value, as little as 11:1. The actual quantities of the ingredients used in Tables 3, 4, 5 and 6 can vary within commercial limits. That is to say, a range of variation of amount of each ingredient of plus or minus 10% by weight could be tolerated without materially disturbing the balance of the Brix-acid ratio.

Within such commercial limits, the ingredients of the additive as set forth in Tables 3, 4, 5 and 6 must be utilized.

The fruit juice concentrate must contain the additives set forth and it is to be noted that these must be used in the proper proportions in order to achieve the desired results and to effect the taste described above. This is a feature of the greatest importance to the product of the invention, in which the tongue acts as an "appestat," that is, turns the personal desire "on or off" for the product itself and for the quantity of it consumed.

Basically, the specific additive for use in practicing the invention comprises a base of sodium chloride with which is intimately admixed magnesium and calcium chlorides, sodium silicate, ferric oxide, ferrous iodide, sulfur, sodium bromide, manganese oxide, calcium sulfate and aluminum oxide. This additive can be made in any desired manner utilizing the amounts approximately as set forth hereinbefore.

With respect to the theory relative to the importance of the discovery of the additive and the concentrate of fruit juices with the additive therein, it is surprising that a drink with such a low Brix-acid ratio as about 11:1 can be palatable and acceptable. It has long been known that less sugar is required in a mixture of fruit juices when the salt is added to the drink. The pleasing flavor is the surprising feature of the result of the present invention. By adding less sugar to juice drinks such as limeade or grapefruit-pineapple, a low Brix-acid ratio such as 11:1 can be easily obtained. These drinks, however, are excessively tart and could not be sold commercially. Processors have found it necessary to add considerably more sugar to such drinks and this has cloying effect on the taste, limiting the acceptability to consumers.

The drink of the present invention is unique, therefore, in possessing a low Brix-acid ratio which will be below 13:1, which makes it tangy and zestful without being too tart. It is smooth and pleasantly sweet without being insipid. Particularly, it appeals to all age groups whereas most commercial drinks of this nature are aimed at a specific type of consumer.

The same mixture of basic fruit juices have been heretofore tried in previous drink formulations, but without notable success. The unique additive heretofore defined apparently renders the low Brix-acid ratio mixture acceptable in flavor and palatable. As a further inherent feature of the concentrated fruit juice of the present invention, while heretofore such concentrates have been limited by the amount of dilution which they can receive without losing flavor, becoming watery or becoming insipid, the dilution factor of the concentrate of the present invention is extremely high. Heretofore, most commercial fruit juice concentrates will only tolerate about 3 times dilution, i.e. one part of juice concentrate to three parts of water. The juice concentrate of the present invention can be greatly diluted, up to 15 times or more its own volume, without undue lack of flavor or other objectionable result. The difference in flavor, taste and palatability between four and eight times dilution of the concentrate of the present invention cannot be detected by the average palate. Thus, the juice concentrate according to the present invention is more economical. Alternatively, it can be used for a dual purpose, the first as a concentrated drink with high nutrient and vitamin values such as is used as an appetizer and the second as a less concentrated or mild drink used for quenching thirst.

Furthermore, the juice concentrate and the diluted drink made therefrom does not need refrigeration to preserve same. The concentrate can be stored on open shelves at ambient temperatures until opened. Even when opened and mixed to drinking strength, deterioration of the contrate or drink will not take place when exposed to air for a long time due to the preservative nature of the additive heretofore described.

The mixture of citrus fruit juices selected for the concentrate may be varied to give a Brix value of between 68° and 75° and a citric acid solids concentration between 6.2% and 6.8% by weight. Thus, the Brix-acid ratio may vary within the values given but, in all cases, it will be lower than heretofore considered acceptable for a citrus fruit juice concentrate.

Modifications of the ingredients of the citrus fruit juice mixture and the additive mixture are obvious to those skilled in the art. Essentially, the fruit juice mixture will contain citrus fruit juice of the desired amount to give the acidity factor required and the ingredients of the additive will contain an intimate mixture of salts containing the cations sodium, magnesium, calcium, iron, potassium, manganese and aluminum and the anions chloride, oxide, silicate, iodide, bromide, and sulfate. Also, other elements or compounds may be added to the additive mixture, if desired, such as sulfur and carbon black, as previously exemplified.

Such modifications of the concentrate, the additive thereof, or the ingredients are within the spirit and scope of the appended claims.

What is claimed is:

1. A liquid fruit juice concentrate consisting essentially of a mixture of a plurality of concentrated juices of fruits (1) selected from the group which consists of orange, lime, lemon, grapefruit and pineapple, (2) about 2½ parts by weight of sugar for each part of fruit solids on a dry basis, (3) an additive to preserve said concentrate and enhance the flavor thereof, the ingredients of said concentrate being proportioned to give a concentration of solids about 71° Brix and a citric acid concentration about 6.3% resulting in a Brix-acid ratio of between 10:1 and 11:1, said additive consisting essentially of a base of an intimate mixture of 65 lbs. of sodium chloride with 4 oz. of magnesium chloride, 2 oz. of calcium chloride, 3½ oz. of sodium silicate, 8 oz. of calcium sulfate, and 2 oz. of aluminum oxide, together with about 14 grams of ferric oxide, about 5 grams of amorphous sulfur, about 2 grams of ferrous iodide, about 3 grams of sodium bromide and about 5 grams of manganese oxide, the additive being added in an amount of about ½ oz. to each gallon of fruit juice.

2. A liquid fruit concentrate consisting essentially of concentrated citrus fruit juices including at least orange juice, grapefruit juice and another citrus fruit juice selected from the group consisting of lemon and lime and about 2½ parts by weight of sugar, for each part of fruit solids on a dry basis, having a solids concentration about 71° Brix and a citric acid concentration of about 6.3% and having a synergistic additive therein in the amount of 10 to 20 grams per gallon of concentrated mixed fruit juices, said additive being formed by admixing intimately 65 lbs. of sodium chloride, 4 oz. magnesium chloride, 2 oz. calcium chloride, sodium silicate 3½ oz., calcium sulfate 8 oz., aluminum oxide 2 oz. and small quantities by weight of other ingredients consisting essentially of 14 grams ferric oxide, 5 grams amorphous sulfur, 2 grams ferrous iodide, 3 grams sodium bromide and 5 grams manganese oxide, said concentrate being formed and being capable of preservation at room temperatures.

3. A concentrated fruit juice drink consisting essentially of in combination of (1) about 2½ parts by weight of sugar for each part of fruit solids on a dry basis, (2) water in proportions to give a citric acid content of about 6.2 to 6.8%, (3) the concentrated juices of lemon, lime, orange, grapefruit and pineapple, (4) lemon oil and orange oil, (5) and 10 to 20 grams per gallon of concentrate of an additive consisting essentially of a base of 65 lbs. of sodium chloride with which has been intimately mixed in the dry state 4 oz. magnesium chloride, 2 oz. calcium chloride, 3½ oz. sodium silicate, together with 14 grams ferric oxide, 3 grams sodium bromide, 5 grams manganese oxide, 8 oz. calcium sulfate and 2 oz. aluminum oxide, the Brix value being between 68 and 75°.

4. A fruit drink as defined in claim 3 in which the additive also contains about 5 grams of sulfur.

5. The method of preparing a fruit juice concentrate which can be stored at room temperature containing (1) concentrated citrus fruit juices of lemon, lime, grapefruit and orange (2) concentrated pineapple juice and (3) sugar which comprises (4) blending the juices and sugar in proportions at ambient temperature to give a Brix value of soluble solids between 68° and 75° and a citric acid concentration between the values of 6.2% and 6.8% by weight (5) intimately mixing on a dry basis 65 lbs. of sodium chloride with 4 oz. magnesium chloride, 2 oz. calcium chloride, 3½ oz. sodium silicate, 8 oz. calcium sulfate and 2 oz. aluminum oxide and (6) adding about 10 to 14 grams of said mixture to each gallon of concentrated fruit juices and sugar, the Brix-acid ratio of the final prepared concentrate being between 10:1 and 12:1.

6. As a composition of matter, a fruit juice concentrate capable of high dilution consisting essentially of fruit juices in concentrated form including orange juice, grapefruit juice, and at least one of the group which consists of lemon juice and lime juice, said concentrated fruit juices having a Brix value of between 68° and 75° and a citric acid to solids concentration between 6.2% and 6.8%, 2½ parts by weight of sugar for each part of fruit solids on a dry basis, a flavoring quantity of natural oil extracts from citric fruit skins, and 10 to 20 grams per gallon of concentrate of a salt mixture having the following primary ingredients in substantially the proportions given:

1040 parts of sodium chloride
4 parts of magnesium chloride
2 parts of calcium chloride
3½ parts sodium silicate
8 parts calcium sulfate
1½ parts ferric oxide
2 parts aluminum oxide

References Cited by the Examiner
UNITED STATES PATENTS

| | | | |
|---|---|---|---|
| 1,978,040 | 10/1934 | Daitz | 99—143 |
| 1,998,179 | 4/1935 | Wolf | 99—143 |
| 2,031,243 | 2/1936 | Wolf | 99—143 |
| 2,347,339 | 4/1944 | Singleton | 99—155 |
| 2,599,431 | 6/1952 | Bruce | 99—105 |
| 2,608,486 | 8/1952 | Arndt | 99—105 |
| 3,114,641 | 12/1963 | Sperti et al. | 99—105 |

OTHER REFERENCES

Food Engineering, pp. 56–57, 190–193, 194, June 1954.

A. LOUIS MONACELL, *Primary Examiner.*